May 26, 1936.  A. E. NAVE  2,041,946
CLOSURE SEAL
Filed July 14, 1934
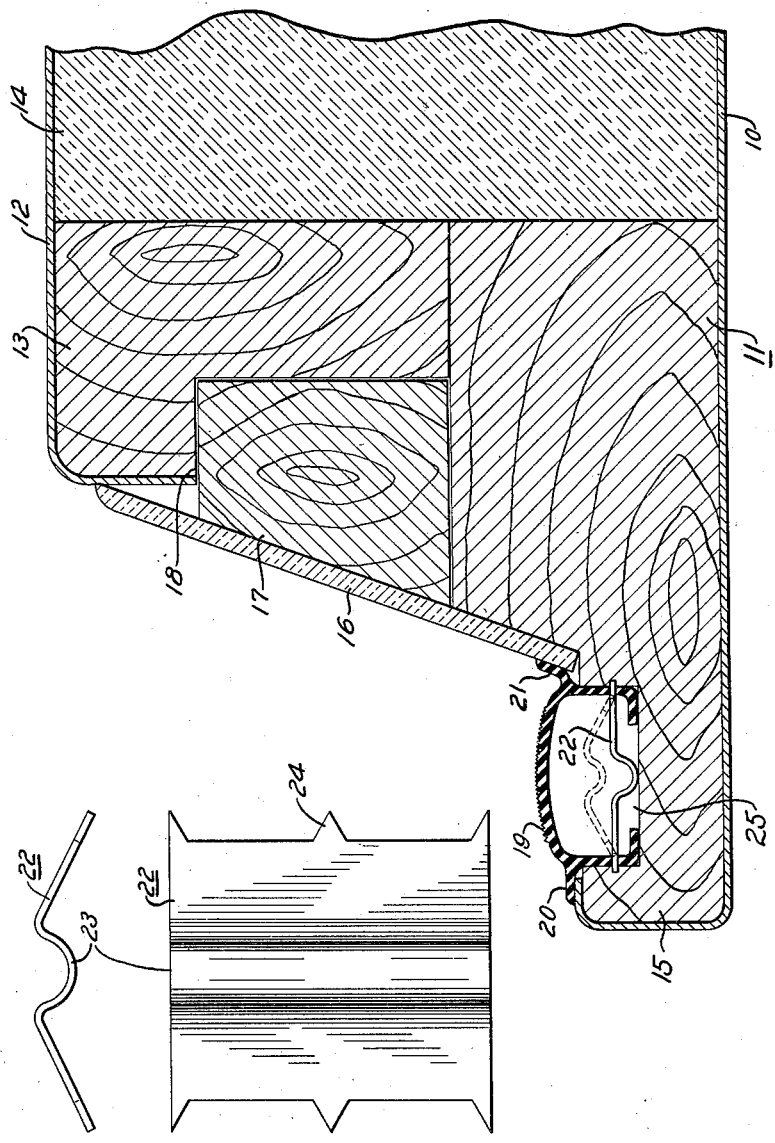
INVENTOR.
Alfred E. Nave
BY
his ATTORNEY.

Patented May 26, 1936

2,041,946

UNITED STATES PATENT OFFICE 2,041,946

CLOSURE SEAL

Alfred E. Nave, Evansville, Ind., assignor to Servel, Inc., New York, N. Y., a corporation of Delaware Application July 14, 1934, Serial No. 735,116

7 Claims. (Cl. 20—35)

My invention relates to a closure seal or gasket and more particularly to an improved article of this character for sealing refrigerator cabinet doors which is simple, durable, and efficient.

A full understanding of my invention, together with the objects and advantages thereof, may be had from consideration of the following description and the accompanying drawing forming a part of this specification and of which:

Fig. 1 is a horizontal section through a portion of a refrigerator cabinet door provided with a seal or gasket in accordance with my invention;

Fig. 2 is an end view of a seal retaining means utilized in the embodiment shown in Fig. 1; and Fig. 3 is a plan view of the seal retaining means.

Referring to Fig. 1 of the drawing, a refrigerator cabinet door, itself of a known construction, comprises an outer sheet metal wall 10 mounted on a wooden frame 11, and an inner metal wall 12 mounted on an inner wooden frame 13, the inner and outer wall assemblies being secured together in any suitable manner. The space between the metal walls, peripherally bounded by the wooden frames, is filled with thermal insulation material 14. The outer door frame 11 is constructed with a peripheral lip or projecting ledge 15, adapted to overlie and abut the refrigerator cabinet wall, not shown, around the door opening when the door is closed, as well known in the art. A strip 16, which may be referred to as a trim strip or breaker strip, is of thermal insulating material and is mounted around the periphery of the door by means of a backing member 17 which is suitably secured in a channel 18 in the door frame. The trim strip 16 may be mounted on the backing member 17, for instance, by gluing under heat and heavy pressure, and the backing member 17 may be secured in the groove or channel 18, for instance, by double-pointed nails, not shown. The trim strip 16 overlies the edge of the inner metal wall 12 which is turned over around the inner frame 13 and also overlies the exposed edge of the outer frame 11 up to the said projecting ledge 15.

In accordance with my invention, the inner or abutment face of the projecting ledge 15 of the outer frame 11 is provided with a groove or channel 25 extending peripherally of the door. I provide a seal member or gasket 19 of soft rubber or other flexible material which is substantially U-shape in cross-section. For securing the gasket, I provide a plurality of metal fasteners 22 like that illustrated in Figs. 2 and 3. This fastener comprises a small metal sheet having teeth or points 24 along a pair of opposite edges, and bent along the center line between the serrated edges at an oblique angle. The center of each fastener 22 is preferably formed in a manner to provide a projection, such as the illustrated trough 23, extending into said oblique angle of the fastener for the purpose which will hereinafter appear. The fasteners 22 may be readily fabricated by a suitable sheet metal stamping process. The distance between the serrated edges of the fasteners 22 is substantially the same as the distance between the inside of the opposite legs of the U-shaped gasket 19.

In assembly, the seal or gasket 19 is placed with its leg portions extending into the groove 25, and with a plurality of the fasteners 22 spaced around the periphery of the door between the legs of the gasket 19 with the serrated edges of the fasteners abutting the legs of the gasket and the vertex of the acute angle directed outwardly of the groove. After the gasket 19 and the fasteners 22 are thus positioned in the groove 25, each fastener may be struck a blow through the flexible gasket. This exerts a force which tends to straighten out the fastener. The blow is struck hard enough or a sufficient number of blows are given to distort each fastener to a substantially straight line position and eliminate said original oblique angle thereof. This causes the teeth 24 on the serrated edges of the fasteners to penetrate the legs of the gasket and the wood frame on each side of the groove 25 to pinion the gasket in position. The described process of assembly may be clearly understood by reference to Fig. 1 where the fastener 22 is shown in its original shape and position by dotted lines, and in its final shape and position in solid outline. The purpose of the projecting portion 23 will now be clearly understood. In straightening out the fastener 22, the projection 23 is brought into contact with the bottom of the groove 25, thereby preventing distortion of the fastener 22 past its desired straight line position.

The seal or gasket 19 may be formed with lips or projections 20 and 21 along opposite sides thereof and exterior to that portion of the gasket without the groove 25, whereby, after assembly of the gasket, the edge of the metal wall 10, turned over around the projecting portion 15 of the outer frame 11, is covered by the gasket projection 20, and one edge of the trim strip 16 is covered by the other gasket projection 21. The seal member or gasket 19 forms a cushioned abutment for the door ledge 15 against the cabinet wall around the door opening when the door is closed, as previously mentioned. That portion of the gasket 19 which is adapted to be brought into contact with the cabinet wall around the door opening, may be knurled or provided with a tread, as illustrated. All parts of the gasket 19, in accordance with my invention, are continuous lengthwise of the gasket, that is, peripherally of the door, and of uniform cross-sectional area. This includes the gasket projections 20 and 21, and the tread on the contact face of the gasket, which tread is preferably a plurality of longitudinal ribs. Of course, the tread and projections 20 and 21 may be omitted if desired and the gasket formed with any desired configuration. It will be understood that a gasket having a uniform cross-sectional area may be produced in a continuous length by a suitable extrusion process which is much simpler than a molding process. It is not absolutely essential that the fasteners 22 penetrate the gasket and the frame, but may merely provide a frictional holding force. It will also be understood that the above described door construction is merely illustrative and that my invention is equally applicable to other types of refrigerator doors.

Various changes and modifications within the scope of my invention will be apparent to those skilled in the art, wherefore my invention is not limited to that which is shown in the drawing and described in the specification, but only as indicated in the following claims.

What I claim is:

1. In a refrigerator cabinet door having a peripheral ledge adapted to overlie and abut a cabinet wall around a door opening, said ledge having a groove extending peripherally in its abutment surface, a gasket of flexible material having portions extending into said groove, and means for securing said gasket comprising an element between the portions of said gasket within said groove and distortable by a force exerted through said flexible gasket to secure said gasket portions within said groove.

2. In a refrigerator cabinet door having a peripheral ledge adapted to overlie and abut a cabinet wall around a door opening, said ledge having a groove extending peripherally in its abutment surface, a substantially U-shaped gasket of flexible material having its leg portions extending into said groove, and means for securing said gasket comprising an element between the leg portions of said gasket within said groove and distortable by a force exerted through said flexible gasket to secure said leg portions within said groove.

3. In a refrigerator cabinet door having a peripheral ledge adapted to overlie and abut a cabinet wall around a door opening, said ledge having a groove extending peripherally around its abutment surface, a substantially U-shaped gasket of flexible material having its leg portions extending into said groove, and a plurality of oblique angled members adapted to be positioned between the leg portions of said gasket within said groove and distortable to a straight line position by a force exerted through said flexible gasket to secure said leg portions within said groove.

4. In a refrigerator cabinet door having a peripheral ledge adapted to overlie and abut a cabinet wall around a door opening, said ledge having a groove extending peripherally in its abutment surface, a flexible gasket produced by an extrusion process and having portions adapted to extend within said groove, and means distortable by a force exerted through said flexible gasket to secure said gasket portions within said groove.

5. In a refrigerator cabinet door having a peripherally extending groove, a closure sealing gasket of flexible material having a portion extending into said groove, and means distortable by a force exerted through said flexible gasket to secure said gasket portion within said groove.

6. A gasket member having internal space and a fastener adapted to be positioned in said space and adapted to spread side walls of the gasket by application of force to the fastener through the gasket.

7. A gasket member having internal space and a fastener adapted to be positioned in said space and adapted to spread side walls of the gasket by application of force to the fastener through the gasket and have an abutment for limiting movement of the fastener on application of said force.

ALFRED E. NAVE.